United States Patent
Xiao et al.

(10) Patent No.: US 10,130,959 B1
(45) Date of Patent: Nov. 20, 2018

(54) SHOWER UNIT WITH EASY TO CHANGE WATER OUTFLOW RATE

(71) Applicant: Kylin Sanitary Technology (Xiamen) Co., Ltd., Xiamen (CN)

(72) Inventors: Hai Huang Xiao, Xiamen (CN); Cun Gui Lai, Xiamen (CN); Qing Shuang Li, Xiamen (CN); You Hui Lan, Xiamen (CN); Hui Huang, Xiamen (CN)

(73) Assignee: KYLIN SANITARY TECHNOLOGY (XIAMEN) CO., LTD., Xiamen City, Fujian Province (CN)

( * ) Notice: Subject to any disclaimer, the term of this patent is extended or adjusted under 35 U.S.C. 154(b) by 0 days.

(21) Appl. No.: 15/783,782

(22) Filed: Oct. 13, 2017

(30) Foreign Application Priority Data

Jul. 10, 2017 (CN) ..................... 2017 2 0827686 U (51) Int. Cl.
| | |
|---|---|
| *B05B 1/30* | (2006.01) |
| *F16K 31/06* | (2006.01) |
| *B05B 1/18* | (2006.01) |
| *B05B 12/00* | (2018.01) |
| *B05B 15/654* | (2018.01) |
| *B05B 15/40* | (2018.01) |

(52) U.S. Cl.
CPC .............. *B05B 1/3013* (2013.01); *B05B 1/18* (2013.01); *B05B 12/002* (2013.01); *B05B 15/654* (2018.02); *B05B 15/40* (2018.02); *F16K 31/0658* (2013.01)

(58) Field of Classification Search
CPC ....... B05B 1/18; B05B 1/3013; B05B 12/002; B05B 15/067; B05B 15/008; B05B 15/40; B05B 15/654; F16K 31/0658; F16K 31/06

USPC .......... 239/562–564, 585.1–585.5, 443, 445, 239/446, 447

See application file for complete search history.

(56) References Cited

U.S. PATENT DOCUMENTS

| | | | | |
|---|---|---|---|---|
| 7,341,239 | B2* | 3/2008 | Hodel | F16K 31/52416 137/872 |
| 8,424,779 | B2* | 4/2013 | Li | B05B 1/1609 239/289 |
| 8,991,432 | B2* | 3/2015 | Zhou | B05B 1/18 137/883 |
| 2011/0309165 | A1* | 12/2011 | Lev | B05B 1/1636 239/562 |

(Continued)

*Primary Examiner* — Christopher Kim
(74) *Attorney, Agent, or Firm* — Muncy, Geissler, Olds & Lowe, P.C.

(57) ABSTRACT

A shower unit, comprises a water inlet assembly and a water outlet assembly mounted on a housing, water outlet channels are arranged on the water outlet assembly, a water inlet and a water outlet are formed in the water inlet assembly, two water inlet channels are arranged in the water inlet assembly, each water inlet channel can communicate with the water inlet and the water outlet independently, and the water outlet channels communicate with the water outlet to spray water; an electromagnetic valve is mounted in one water inlet channel, a circuit board mounted on the housing is electrically connected with a switch, each time the switch is pressed, the circuit board powers on and then powers off the electromagnetic valve after a set delay, which respectively opens and closes the water inlet channel. The water outflow rate of the shower unit can be changed rapidly, and has water-saving effects.

10 Claims, 7 Drawing Sheets

(56) References Cited

U.S. PATENT DOCUMENTS

2012/0261496 A1* 10/2012 Lev ..................... B05B 1/1636
239/443

* cited by examiner

SHOWER UNIT WITH EASY TO CHANGE WATER OUTFLOW RATE

BACKGROUND OF THE INVENTION

Technical Field

The invention relates to the technical field of manufacturing, in particular to a shower unit with easy to change water outflow rate.

Description of Related Art

When people take a shower, the water outflow rate of a shower unit is generally fixed, and can only change slightly along with changes of the water pressure and cannot be controlled manually; for changing the water outflow rate, a water-mixing switch is generally needed for adjustment, and consequentially adjustment is troublesome. In the showering process, the water outflow rate required for mere showering is different from the water outflow rate required for rinsing after shampoo and shower gel are applied, the water outflow rate required for mere showering is small, and the water outflow rate required for rinsing after shampoo and shower gel are applied is large; if the water outflow rate is kept constant, water can be wasted when the water outflow rate is large, and thorough rinsing cannot be achieved if the water outflow rate is small.

BRIEF SUMMARY OF THE INVENTION

The invention aims to provide a shower unit with easily changeable water outflow rate, and since the water outflow rate of the shower unit can be changed rapidly, the shower unit can meet showering and rinsing requirements of people and has a good water-saving effect.

According to the technical scheme adopted by the invention for achieving the above purpose, the shower unit with easily changeable water outflow rate comprises a housing and is characterized in that a water inlet assembly and a water outlet assembly are mounted on the upper portion and the lower portion of the housing respectively, at least one water outlet channel is arranged on the water outlet assembly, a water inlet and a water outlet are formed in the upper portion and the lower portion of the water inlet assembly respectively, two water inlet channels are arranged in the middle of the water inlet assembly, each water inlet channel can communicate with the water inlet and the water outlet independently, and the water outlet channels on the water outlet assembly communicate with the water outlet to spray out water;

an electromagnetic valve used for on-off control is mounted in one water inlet channel, a circuit board is further mounted on the housing and electrically connected with a switch, each time the switch is pressed, the circuit board powers on the electromagnetic valve and then powers off the electromagnetic valve a set period of delay time later, and the water inlet channel controlled by the electromagnetic valve is opened after the electromagnetic valve is powered on and is closed after the electromagnetic valve is powered off.

Preferably, the water inlet assembly comprises a water inlet pipe and a water outlet component, the upper portion of the water inlet pipe is fixedly connected to the internal upper portion of the housing through a lock nut, the water inlet is formed in the upper end of the water inlet pipe, the water outlet component is fixedly connected to the lower end of the water inlet pipe, and the water outlet is formed in the water outlet component; two water inlet channels are arranged in the middle of the water inlet pipe, and the electromagnetic valve is mounted in one water inlet channel.

Furthermore, an upper partition plate and a lower partition plate are arranged in the middle of the water inlet pipe, and a groove is formed in the side face of the portion, between the upper partition plate and the lower partition plate, of the water inlet pipe; a first upper through hole and a second upper through hole are formed in the upper partition plate, and a first lower through hole and a second lower through hole are formed in the lower partition plate; the first upper through hole and the first lower through hole communicate through an inner hole of the water inlet pipe to form one water inlet channel, and the second upper through hole and the second lower through hole communicate through the groove to form the other water inlet channel; the electromagnetic valve comprises a shell, an upper pipe extends from the upper portion of the shell, a lower pipe extends from the lower portion of the shell, a water channel is arranged in the middle of the shell, an inner hole of the upper pipe communicates with an inner hole of the lower pipe through the water channel, a coil is mounted in the shell and located on the periphery of the water channel, and an iron core and a first compression spring are mounted in the water channel; the shell of the electromagnetic valve is inlaid in the groove, the upper pipe is inserted into the second upper through hole, and the lower pipe penetrates through the second lower through hole; when the coil of the electromagnetic valve is powered off, the first compression spring drives the iron core to block the water channel, and when the coil of the electromagnetic valve is powered on, electromagnetic force drives the iron core to overcome elastic force of the first compression spring so as to open the water channel.

Furthermore, a plurality of water outlet channels are arranged on the water outlet assembly, the whole water outlet assembly can rotate relative to the water outlet component, and the water outlet on the water outlet component selectively corresponds to one or more water outlet channels on the water outlet assembly or does not correspond to the water outlet channels on the water outlet assembly.

Furthermore, the water outlet assembly preferably comprises a water outlet base, a water outlet plate and a surface cover, wherein a cylinder extends downwards from the middle of the lower portion of the water outlet component, a through hole is formed in the middle of the water outlet base, a through hole is formed in the middle of the water outlet plate, and the cylinder is sequentially sleeved with the water outlet base and the water outlet plate through the middle through holes; a screw is locked to the lower end of the cylinder, the water outlet plate is clamped through the head of the screw, and the water outlet plate is sleeved with the surface cover and fixedly connected with the surface cover; a plurality of water outlet channels are arranged on the water outlet base, and a plurality of water spray holes are formed in the water outlet plate, or water spray holes are formed in the water outlet base and the water outlet plate.

Furthermore, a protrusion extends outwards from the outer side face of the water outlet component, a concave hole is formed in the lower end face of the protrusion, and a plurality of locating grooves are formed in the upper end face of the water outlet base; a second compression spring and a locating column are sequentially mounted in the concave hole, and when the water outlet base is rotated, the locating column can be sequentially matched with different locating grooves on the upper end face of the water outlet base. In this way, the rotating position of the water outlet assembly can be controlled conveniently.

Furthermore, a sealing element is further mounted at the water outlet of the water outlet component, a water outlet through hole is formed in the sealing element, third compression springs are arranged between the sealing element and the water outlet component, and the lower end face of the sealing element abuts against the upper end face of the water outlet base. In this way, the reliability of water switching and the sealing performance can be improved.

Furthermore, a water inlet component provided with a ball is connected to the water inlet of the water inlet pipe, a water inlet hole is formed in the middle of the water inlet component, and the lock nut clamps the ball of the water inlet component through an annular piece.

Furthermore, a battery is mounted in the housing, and the battery is electrically connected with the circuit board.

Furthermore, the housing comprises a body and a protruding part, the water outlet assembly is mounted on the lower portion of the body, the circuit board is mounted in the protruding part, a pressing part is arranged on the lower end face of the protruding part, and the switch can be pressed by touching the pressing part; the lower end face of the pressing part is higher than the lower end face of the water outlet assembly.

According to the invention, the two water inlet channels are arranged in the middle of the water inlet assembly, the electromagnetic valve used for on-off control is mounted in one water inlet channel, the circuit board is further mounted on the housing and electrically connected with the switch, each time the switch is pressed, the circuit board powers on the electromagnetic valve and then powers off the electromagnetic valve a set period of delay time later, and the water inlet channel controlled by the electromagnetic valve is opened after the electromagnetic valve is powered on and is closed after the electromagnetic valve is powered off. In this way, when the electromagnetic valve is in the power-off state, water only flows through one water inlet channel on the water inlet assembly and is sprayed out at a small flow rate from the water outlet assembly of the shower, and the showering requirement can be met; when rinsing is needed after shampoo and shower gel are applied by pressing the switch once, the circuit board can power on the electromagnetic valve in a set period of time and then power off the electromagnetic valve, water flows through the two water inlet channels on the water inlet assembly and is sprayed out at a large flow rate from the water outlet assembly of the shower unit in the time period of time when the electromagnetic valve is on, and thus the rinsing requirement is met; after the delay time is up, the shower unit can be automatically switched to a small water outflow rate again. Therefore, the water outflow rate of the shower unit can be changed rapidly, and the shower unit can meet showering and rinsing requirements of people and has a good water-saving effect.

DETAILED DESCRIPTION OF THE INVENTION

A further detailed description of the invention is given with accompanying drawings and specific execution modes as follows.

As is shown in FIGS. 1-7, a shower unit with easy to change water outflow rate comprises a housing 1, wherein the housing 1 comprises a body 11 and a protruding part 12, a water inlet assembly 2 is mounted on the upper portion of the body 11 of the housing 1, a water outlet assembly 3 is mounted on the lower portion of the body 11 of the housing 1, and two water outlet channels are arranged on the water outlet assembly 3.

The water inlet assembly 2 comprises a water inlet pipe 21 and a water outlet component 22, the upper portion of the water inlet pipe 21 is fixedly connected to the internal upper portion of the body 11 of the housing 1 through a lock nut 23, a water inlet 211 is formed in the upper end of the water inlet pipe 21, the water outlet component 22 is fixedly connected to the lower end of the water inlet pipe 21, and the water outlet component 22 can also be integrally connected with the water inlet pipe 21; a water outlet 221 is formed in the water outlet component 22, and the water outlet channels on the water outlet assembly 3 communicate with the water outlet 221 to spray out water; two water inlet channels are arranged in the middle of the water inlet pipe 21, each water inlet channel can communicate with the water inlet 211 and the water outlet 221 independently, and one water inlet channel is provided with an electromagnetic valve 4 used for on-off control; a circuit board 5 is mounted in the protruding part 12 of the housing 1, a switch 51 is mounted on the circuit board 5 and electrically connected with the circuit board 5, each time the switch 51 is pressed, the circuit board 5 powers on the electromagnetic valve 4 and then powers off the electromagnetic valve 4 a set period of delay time later (such as 30 seconds), and the water inlet channel controlled by the electromagnetic valve 4 is opened after the electromagnetic valve 4 is powered on and is closed after the electromagnetic valve 4 is powered off.

Figure 2:
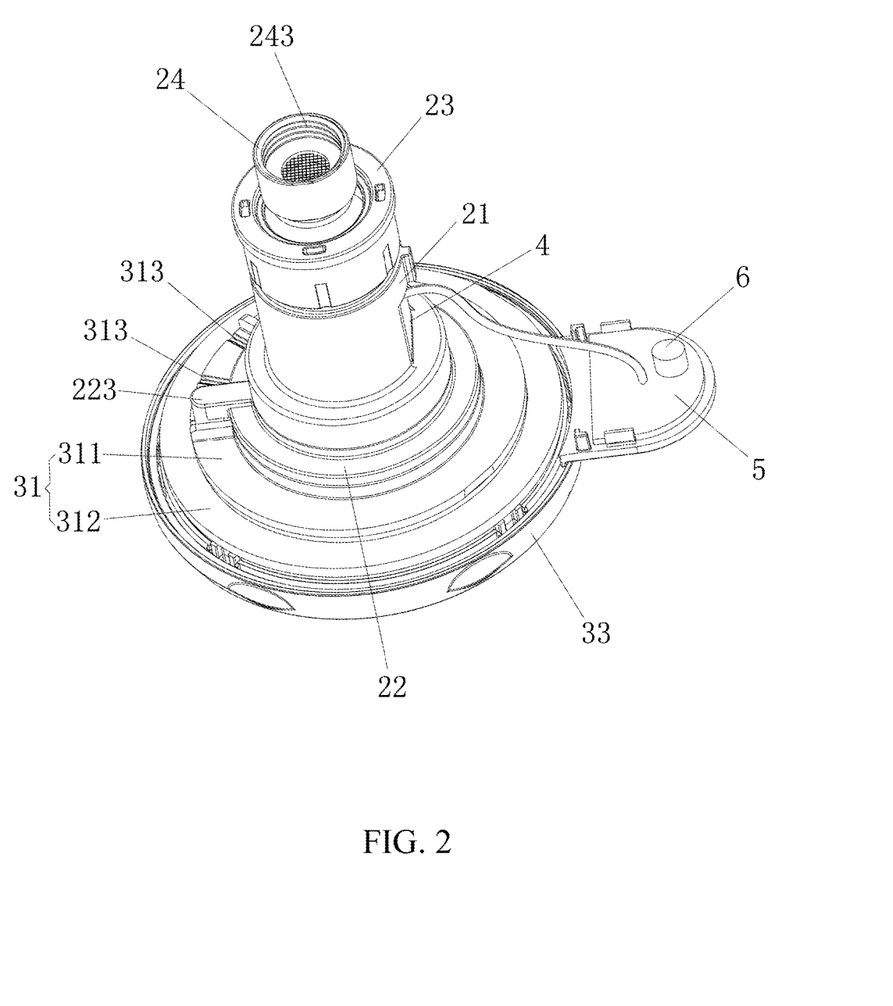
FIG. 2 is a top perspective view of a hidden housing of the invention.
Figure 3:
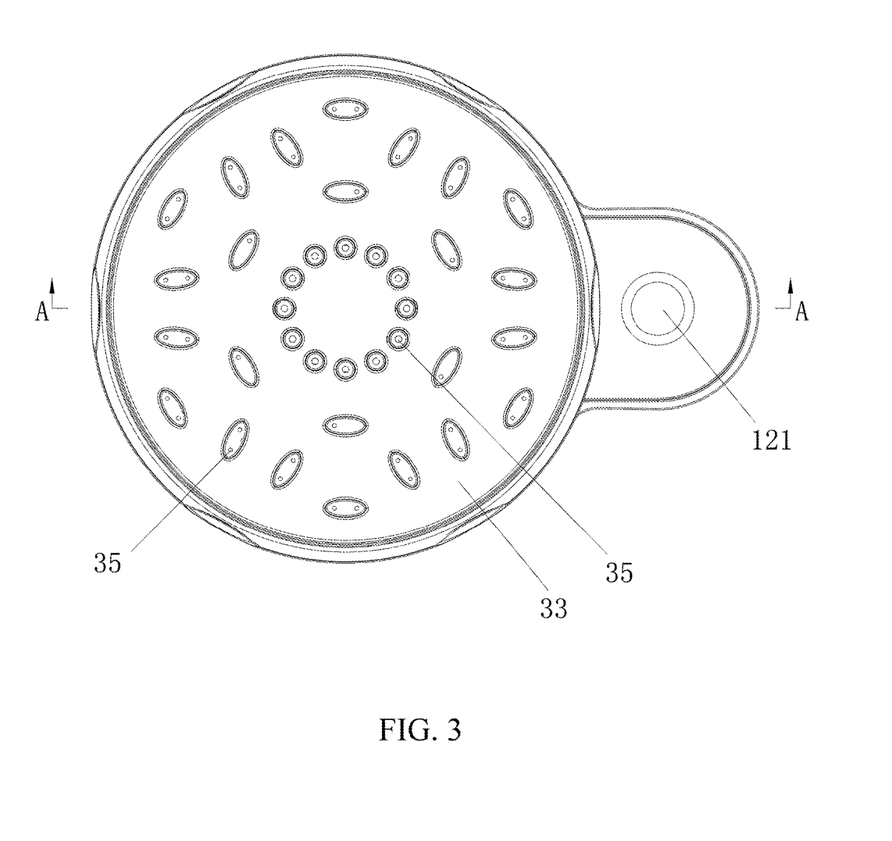
FIG. 3 is a front view of the invention.

A battery 6 is mounted in the protruding part 12 of the housing 1, and the battery 6 is electrically connected with the circuit board 5. The battery 6 can be a dry battery or a rechargeable battery.

Figure 1:
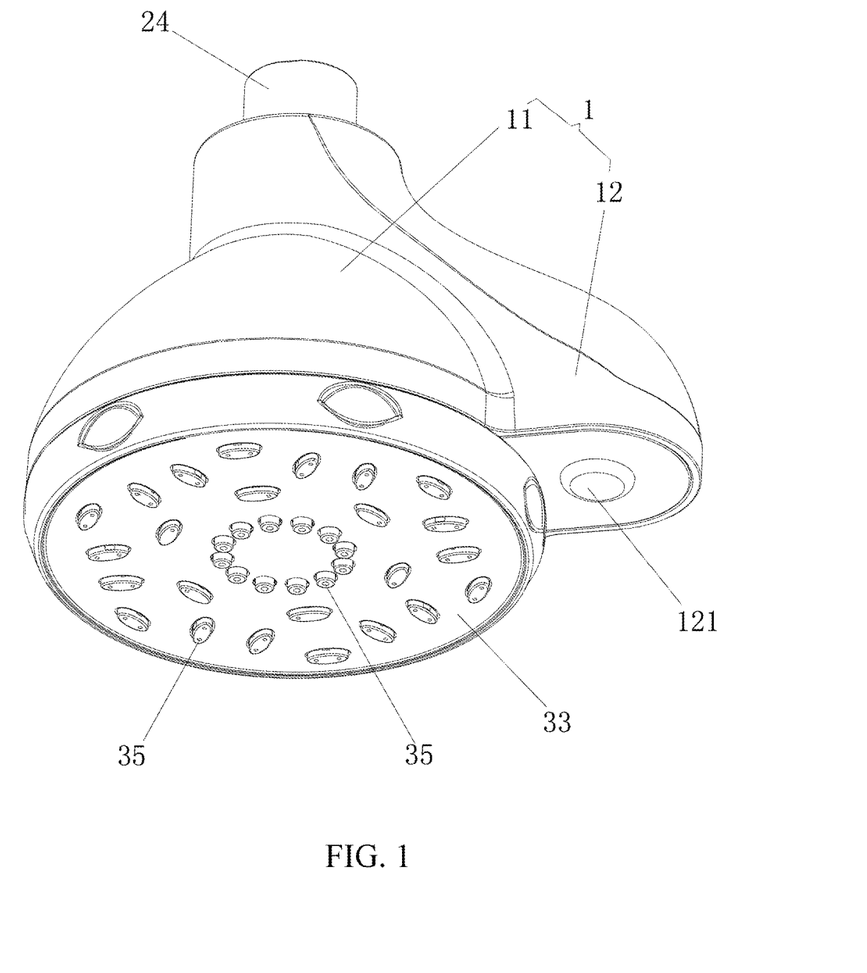
FIG. 1 is a bottom perspective view of the invention.

A pressing part 121 is arranged on the lower end face of the protruding part 12, and the switch 51 can be pressed by touching the pressing part 121; the lower end face of the pressing part 121 is higher than the lower end face of the water outlet assembly 3.

Figure 4:
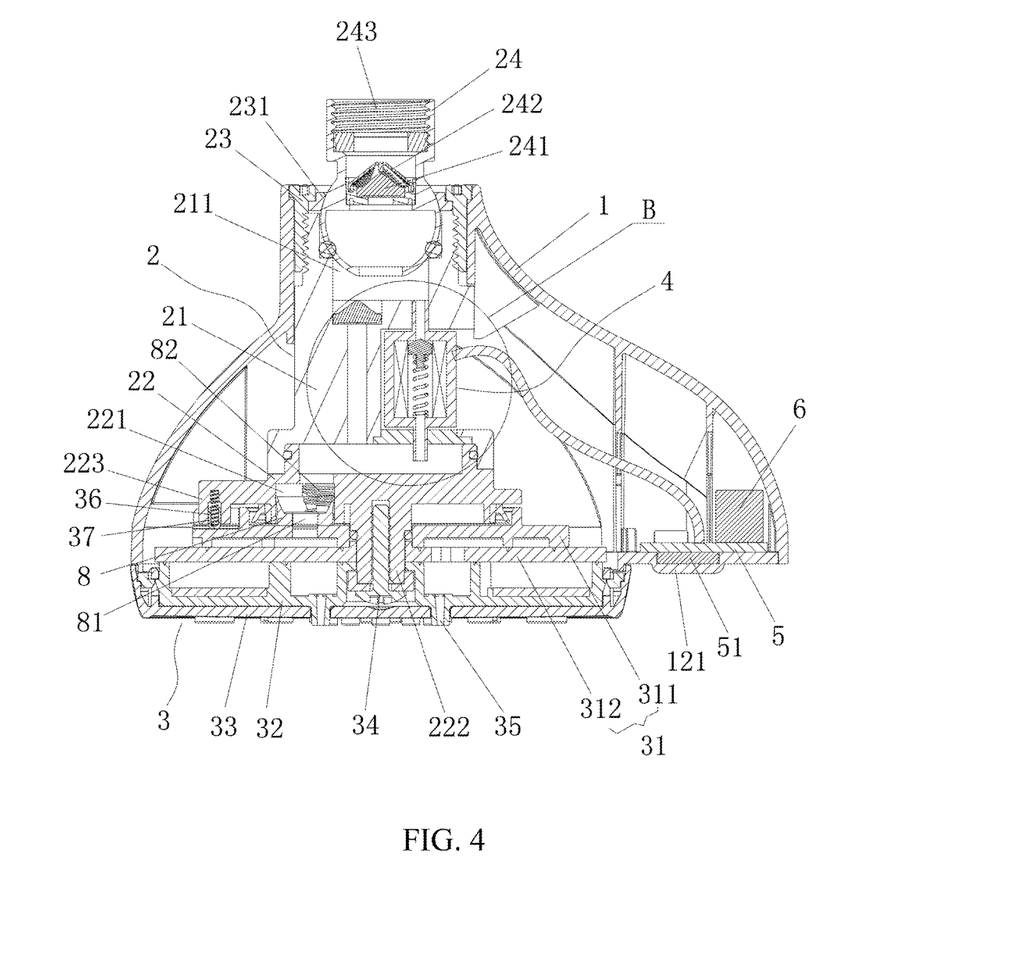
FIG. 4 is a sectional view taken along line A-A of FIG. 3.
Figure 6:
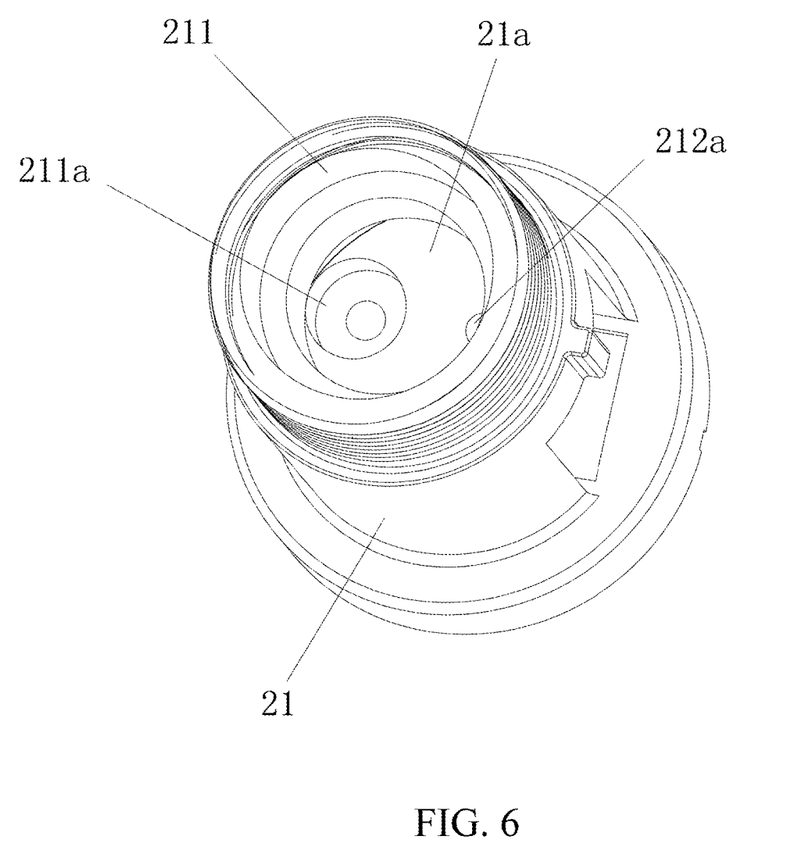
FIG. 6 is a top perspective view of a water inlet pipe.
Figure 7:
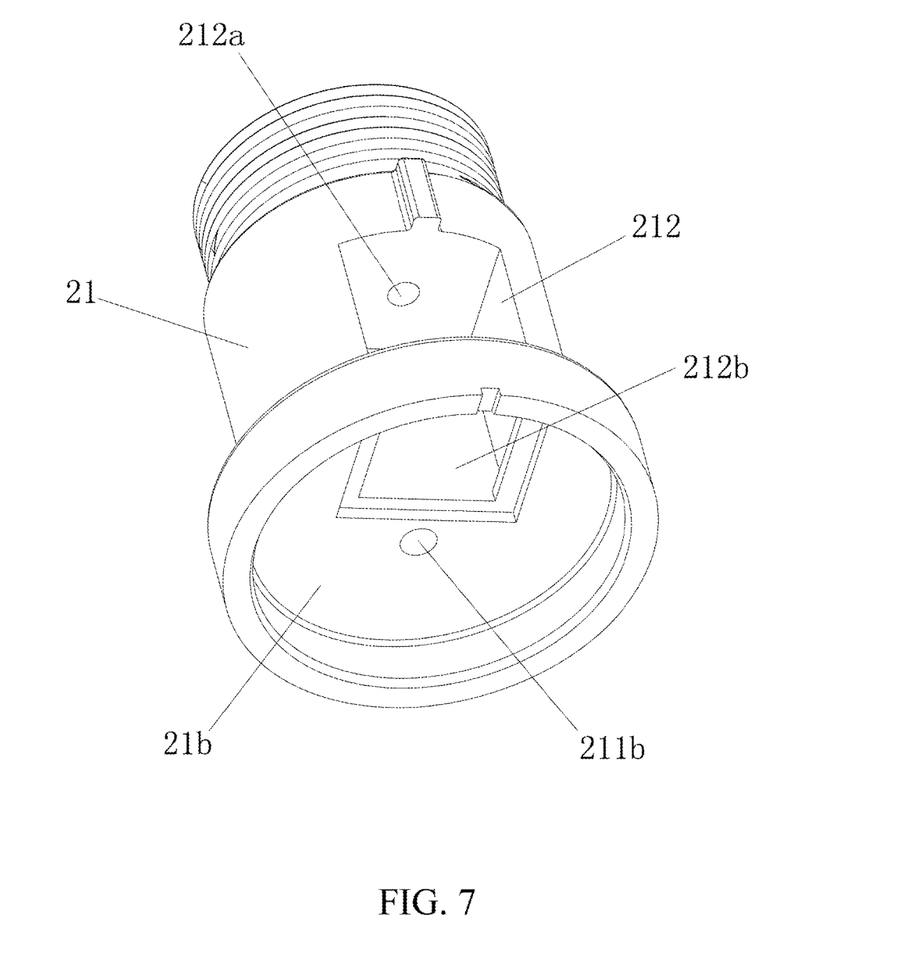
FIG. 7 is a bottom perspective view of the water inlet pipe.

An upper partition plate 21a and a lower partition plate 21b are arranged in the middle of the water inlet pipe 21, and a groove 212 is formed in the side face of the portion, between the upper partition plate 21a and the lower partition plate 21b, of the water inlet pipe 21; a first upper through hole 211a and a second upper through hole 212a are formed in the upper partition plate 21a, and a first lower through hole 211b and a second lower through hole 212b are formed in the lower partition plate 21b; the first upper through hole 211a and the first lower through hole 211b communicate through an inner hole of the water inlet pipe 21 to form one water inlet channel, a first flow limiting component 6 is mounted in the first upper through hole 211a, and the second upper through hole 212a and the second lower through hole 212b communicate through the groove 212 to form the other water inlet channel;

the electromagnetic valve 4 comprises a shell 41, an upper pipe 42 extends from the upper portion of the shell 41, a lower pipe 43 extends from the lower portion of the shell 41, a water channel 44 is arranged in the middle of the shell 41, an inner hole of the upper pipe 42 communicates with an inner hole of the lower pipe 43 through the water channel 44, a coil 45 is mounted in the shell 41 and located on the periphery of the water channel 44, and an iron core 46 and a first compression spring 47 are mounted in the water channel 44; the shell 41 of the electromagnetic valve 4 is inlaid in the groove 212, the upper pipe 42 is inserted into the second upper through hole 212a, and the lower pipe 43 penetrates through the second lower through hole 212b; when the coil 45 of the electromagnetic valve 4 is powered off, the first compression spring 47 drives the iron core 46 to block the water channel 44, and when the coil 45 of the electromagnetic valve 4 is powered on, electromagnetic force drives the iron core 46 to overcome elastic force of the first compression spring 47 so as to open the water channel 44.

The whole water outlet assembly 3 can rotate relative to the water outlet component 22, the water outlet 221 on the water outlet component 22 selectively corresponds to one or two water outlet channels on the water outlet assembly 3 or does not correspond to the water outlet channels on the water outlet assembly 3, and thus various water outlet states can be formed.

The water outlet assembly 3 comprises a water outlet base 31, a water outlet plate 32 and a surface cover 33, wherein a cylinder 222 extends downwards from the middle of the lower portion of the water outlet component 22, a through hole is formed in the middle of the water outlet base 31, a through hole is formed in the middle of the water outlet plate 32, and the cylinder 222 is sequentially sleeved with the water outlet base 31 and the water outlet plate 32 through the middle through holes; a screw 34 is locked to the lower end of the cylinder 222, the water outlet plate 32 is clamped through the head of the screw 34, and the water outlet plate 32 is sleeved with the surface cover 33 and fixedly connected with the surface cover 33; in this way, the water outlet base 31 and the water outlet plate 32 can be rotated integrally by rotating the surface cover 33, and thus the water outlet base 31, the water outlet plate 32 and the surface cover 33 can rotate relative to the water outlet component 22.

The water outlet base 31 is provided with two water outlet channels and a water spray hole 35, the water outlet plate 32 is also provided with a water spray hole 35, and the two water spray holes 35 communicate with the two water outlet channels respectively and are both located outside the surface cover 33.

Figure 5:
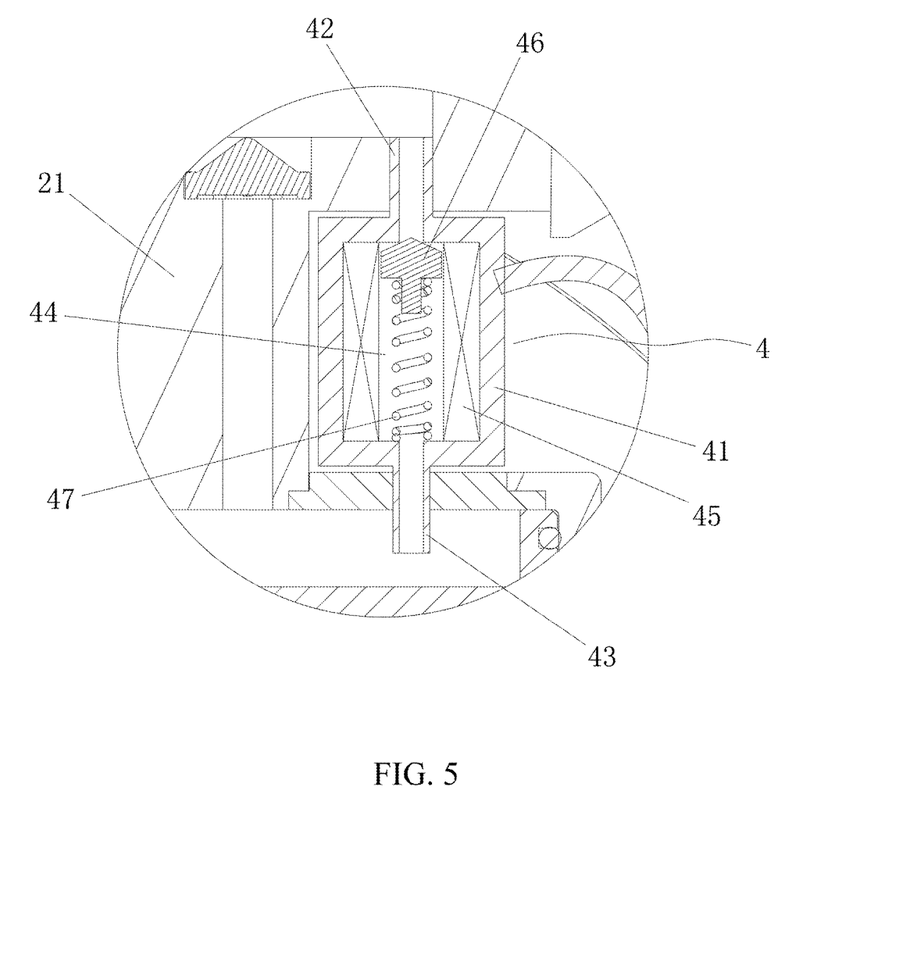
FIG. 5 is an enlarged view of the portion B in FIG. 4.

Furthermore, the water outlet base 31 comprises an upper water outlet base body 311 and a lower water outlet base body 312, and the upper water outlet base body 311 leans against the lower water outlet base body 312; a protrusion 223 extends outwards from the outer side face of the water outlet component 22, a concave hole is formed in the lower end face of the protrusion 223, and three locating grooves 313 are formed in the upper end face of the upper water outlet base body 311; a second compression spring 36 and a locating column 37 are sequentially mounted in the concave hole, and when the whole water outlet base 31 is rotated, the locating column 37 can be sequentially matched with different locating grooves 313 on the upper end face of the upper water outlet base body 311. In this way, the rotating position of the whole water outlet assembly 3 can be located conveniently, and the water outlet state is controlled accordingly.

A sealing element 8 is further mounted at the water outlet 221 of the water outlet component 22, a water outlet through hole 81 is formed in the sealing element 8, two third compression springs 82 are arranged between the sealing element 8 and the water outlet component 22, and the lower end face of the sealing element 8 abuts against the upper end face of the upper water outlet base body 311. The water outlet through hole 81 formed in the sealing element 8 selectively corresponds to the two water outlet channels arranged on the water outlet base 31.

A water inlet component 24 provided with a ball is connected to the water inlet 211 of the water inlet pipe 21, a water inlet hole is formed in the middle of the water inlet component 24, and the lock nut 23 clamps the ball of the water inlet component 24 through an annular piece 231.

A second flow limiting component 241 and a filter screen 242 are mounted in the middle water inlet hole of the water inlet component 24. A connecting internal thread 243 is further arranged in the middle water inlet hole of the water inlet component 24.

When the shower unit with the water outlet rate easy to control in the embodiment is in use, the water inlet component 24 is connected with an external water inlet pipeline through the connecting internal thread 243, and water is sprayed out continuously at a small flow rate through one water inlet channel of the water inlet pipe 21 after entering the external water inlet pipeline; when water needs to be sprayed out at a large flow rate by the shower, the switch 51 is pressed once by touching the pressing part 121, the circuit board 5 powers on the electromagnetic valve 4 and then powers off the electromagnetic valve 4 a set period of delay time later (such as 30 seconds), and the water inlet channel controlled by the electromagnetic valve 4 is opened after the electromagnetic valve 4 is powered on and is closed after the electromagnetic valve 4 is powered off. In this way, water is sprayed out at a large flow rate through the two water inlet channels of the water inlet pipe 21 during the period of delay time, and the shower unit is switched to a small outflow rate again after the delay time reaches a set value. A large water outflow rate required by people for rinsing after shampoo and shower gel are applied can be obtained, and a good water-saving effect can be achieved.

The foregoing description is only one preferred embodiment of the invention, and equivalent changes made by those skilled in the field according to the claims are all within the protection scope of the scheme.

What is claimed is:

1. A shower unit with easy to change water outflow rate, comprising a housing, wherein a water inlet assembly and a water outlet assembly are mounted on an upper portion and a lower portion of the housing respectively, at least one water outlet channel is arranged on the water outlet assembly, a water inlet and a water outlet are formed in an upper portion and a lower portion of the water inlet assembly respectively, two first water inlet channels are arranged in a middle of the water inlet assembly, each of the first two water inlet channels can communicate with the water inlet and the water outlet independently, and the at least one water outlet channel on the water outlet assembly communicates with the water outlet to spray out water;

an electromagnetic valve used for on-off control is mounted in one of the two first water inlet channels, a circuit board is further mounted on the housing and electrically connected with a switch, each time the switch is pressed, the circuit board powers on the electromagnetic valve and then powers off the electromagnetic valve a set period of delay time later, and the two first water inlet channels controlled by the electromagnetic valve is opened after the electromagnetic valve is powered on and is closed after the electromagnetic valve is powered off.

2. The shower unit with easy to change water outflow rate according to claim 1, wherein the water inlet assembly comprises a water inlet pipe and a water outlet component, an upper end of the water inlet pipe is fixedly connected to an internal upper portion of the housing through a lock nut, the water inlet is formed in the upper end of the water inlet pipe, the water outlet component is fixedly connected to a lower end of the water inlet pipe, and the water outlet is formed in the water outlet component; two second water inlet channels are arranged in a middle of the water inlet pipe, and the electromagnetic valve is mounted in one of the two second water inlet channels.

3. The shower unit with easy to change water outflow rate according to claim 2, wherein an upper partition plate and a lower partition plate are arranged in the middle of the water inlet pipe, and a groove is formed in g side face of a portion, between the upper partition plate and the lower partition plate, of the water inlet pipe; a first upper through hole and a second upper through hole are formed in the upper partition plate, and a first lower through hole and a second lower through hole are formed in the lower partition plate; the first upper through hole and the first lower through hole communicate through an inner hole of the water inlet pipe to form one of third water inlet channels, and the second upper through hole and the second lower through hole communicate through the groove to form the other of the third water inlet channels; the electromagnetic valve comprises a shell, an upper pipe extends from the upper portion of the shell, a lower pipe extends from the lower portion of the shell, a water channel is arranged in a middle of the shell, an inner hole of the upper pipe communicates with an inner hole of the lower pipe through the water channel, a coil is mounted in the shell and located on a periphery of the water channel, and an iron core and a first compression spring are mounted in the water channel; the shell of the electromagnetic valve is inlaid in the groove, the upper pipe is inserted into the second upper through hole, and the lower pipe penetrates through the second lower through hole; when the coil of the electromagnetic valve is powered off, the first compression spring drives the iron core to block the water channel, and when the coil of the electromagnetic valve is powered on, electromagnetic force drives the iron core to overcome elastic force of the first compression spring so as to open the water channel.

4. The shower unit with easy to change water outflow rate according to claim 2, wherein a plurality of first water outlet channels are arranged on the water outlet assembly, the water outlet assembly can rotate relatively to the water outlet component, and the water outlet on the water outlet component selectively corresponds to one or more of the plurality of first water outlet channels on the water outlet assembly or does not correspond to the plurality of first water outlet channels on the water outlet assembly.

5. The shower unit with easy to change water outflow rate according to claim 4, wherein the water outlet assembly comprises a water outlet base, a water outlet plate and a surface cover, a cylinder extends downwards from a middle of a lower portion of the water outlet component, a through hole is formed in a middle of the water outlet base, a through hole is formed in a middle of the water outlet plate, and the cylinder is sequentially sleeved with the water outlet base and the water outlet plate through the through hole of the water outlet base and the through hole of the water outlet plate; a screw is locked to a lower end of the cylinder, the water outlet plate is clamped through a head of the screw, and the water outlet plate is sleeved with the surface cover and fixedly connected with the surface cover; a plurality of second water outlet channels are arranged on the water outlet base, and a plurality of water spray holes are formed in the water outlet plate, or a plurality of water spray holes are formed in the water outlet base and the water outlet plate respectively.

6. The shower unit with easy to change water outflow rate according to claim 5, wherein a protrusion extends outwards from an outer side face of the water outlet component, a concave hole is formed in a lower end face of the protrusion, and a plurality of locating grooves are formed in an upper end face of the water outlet base; a second compression spring and a locating column are sequentially mounted in the concave hole, and when the water outlet base is rotated, the locating column can be sequentially matched with each of the locating grooves on the upper end face of the water outlet base.

7. The shower unit with easy to change water outflow rate according to claim 5, wherein a sealing element is further mounted at the water outlet of the water outlet component, a water outlet through hole is formed in the sealing element, third compression springs are arranged between the sealing element and the water outlet component, and a lower end face of the sealing element abuts against the upper end face of the water outlet base.

8. The shower unit with easy to change water outflow rate according to claim 2, wherein a water inlet component provided with a ball is connected to the water inlet of the water inlet pipe, a water inlet hole is formed in a middle of the water inlet component, and the lock nut clamps the ball of the water inlet component through an annular piece.

9. The shower unit with easy to change water outflow rate according to claim 1, wherein a battery is mounted in the housing, and the battery is electrically connected with the circuit board.

10. The shower unit with easy to change water outflow rate according to claim 1, wherein the housing comprises a body and a protruding part, the water outlet assembly is mounted on a lower portion of the body, the circuit board is mounted in the protruding part, a pressing part is arranged on a lower end face of the protruding part, and the switch can be pressed by touching the pressing part; a lower end face of the pressing part is higher than a lower end face of the water outlet assembly.

* * * * *